United States Patent [19]

Brandon

[11] 4,036,668

[45] July 19, 1977

[54] BONDING FLUOROELASTOMERS TO METAL

[75] Inventor: William D. Brandon, Peoria, Ill.

[73] Assignee: Caterpillar Tractor Co., Peoria, Ill.

[21] Appl. No.: 558,765

[22] Filed: Mar. 17, 1975

Related U.S. Application Data

[63] Continuation-in-part of Ser. No. 307,420, Nov. 17, 1972, abandoned.

[51] Int. Cl.² .................... C23C 11/12; B32B 25/04
[52] U.S. Cl. .................. 148/6.35; 156/153; 264/127; 264/259; 264/265
[58] Field of Search ............. 148/6.35, 6.0; 428/421, 428/422; 156/322, 333, 153; 29/180 NM, 180 CA, 195 E, 195 T, 196.1; 264/259–262, 265, 127

[56] References Cited

U.S. PATENT DOCUMENTS

| 2,944,927 | 7/1960 | Dosmann | 156/306 |
| 2,951,783 | 9/1960 | Landrum | 428/421 |
| 3,063,882 | 11/1962 | Cheshire | 428/422 |
| 3,107,197 | 10/1963 | Stein et al. | 428/422 |
| 3,206,344 | 9/1965 | Elkins, Jr. | 156/86 |
| 3,501,360 | 3/1970 | Mancel | 156/153 |
| 3,666,516 | 5/1972 | Dunning | 156/232 X |
| 3,684,545 | 8/1972 | Worrall | 428/914 X |
| 3,799,832 | 3/1974 | Reick | 428/421 |

FOREIGN PATENT DOCUMENTS

| 1,153,378 | 5/1969 | United Kingdom |
| 1,158,945 | 7/1969 | United Kingdom |
| 1,188,247 | 4/1970 | United Kingdom |
| 1,199,858 | 7/1970 | United Kingdom |

OTHER PUBLICATIONS

Webster's Seventh New Collegiate Dictionary, 1967, p. 203, G. & C. Merriam Company, Springfield, Mass.

*Primary Examiner*—William A. Powell
*Assistant Examiner*—Thomas Bokan
*Attorney, Agent, or Firm*—Phillips, Moore, Weissenberger, Lempio & Majestic

[57] ABSTRACT

Fluoroelastomers, including ultra high temperature, thermally stable fluoroelastomers, are bonded to a metal backing member by (a) compounding the fluoroelastomers with CaO, (b) curing the fluoroelastomers in contact with a pretreated surface of the metal member, and (c) postcuring the fluoroelastomers/metal unit at elevated temperatures.

8 Claims, No Drawings

BONDING FLUOROELASTOMERS TO METAL

CROSS-REFERENCE TO RELATED APPLICATION

This application is a continuation-in-part of applicant's co-pending application Ser. No. 307,420, filed Nov. 17, 1972, now abandoned.

BACKGROUND OF THE INVENTION

This invention relates to bonding fluoroelastomers to metal. More particularly, the invention relates to a method of directly bonding fluoroelastomers to metal by non-adhesive means, i.e., without the use of a bonding agent.

The fluoroelastomers of this invention are typically relatively chemically inert, thermally stable polymers, owing primarily to the strength of the carbon-fluorine bonds present in the molecule. Because of the thermal stability of these molecules, the fluoroelastomers are desirable in many applications which require elastomeric materials which will withstand high bulk temperature moduli. However, a great number of these applications, particularly in mechanical fields, require the elastomer to be used in conjunction with stiffening, or backup members, most often fabricated from metal, and hence require a method of bonding the elastomer to the metal member which will provide a bond capable of withstanding high temperatures and sustained or heavy loading. Particular examples include clutch plates and brake linings, where high friction coefficients result in very high ambient temperatures; many other examples will be apparent.

Unfortunately, the inherent properties of the fluoroelastomers, in particular chemical inertness, have made it difficult and, in some instances, impossible to effectively adhere these fluoroelastomers to a metal, especially where high shear or impact strength is required in the finished fluoroelastomer-metal laminate, or where the finished laminate will be exposed to high ambient temperatures. The problem of bonding the ultra-high temperature thermally stable fluoroelastomers has been particularly troublesome.

One particular problem which exists with obtaining adequate bonding of fluoroelastomer to metals while at the same molding the fluoroelastomer to a desired shape and curing it in that shape has been introduced by the fact that curing of the fluoroelastomer and bonding of the fluoroelastomer to metals generally occur at very different rates. If the curing is much faster than the bonding, then inadequate bonding results. On the other hand, if the bonding is mush faster than the curing, then the laminate must be retained in the mold long after the bonding is complete or the laminate will not be properly formed and a gummy mess will be all that is removed from the mold. Long times within the mold are clearly undesirable from a practical view point since the yield of finished laminates then becomes limited by the mold time.

Prior art methods which have been employed for bonding some types of fluoroelastomers to metal have most commonly involved chemical bonding of the fluoroelastomer to the metal substrate with an adhesive bonding agent. These methods have limited application, however, since with both structural and nonstructural adhesives, the bond achieved is not generally capable of withstanding sustained or heavy loading, or high ambient temperatures. Further, the adhesive bonding agent is highly subject to scuffing and wiping during injection and transfer molding of the product, which deactivates or destroys this agent, and therefore molding techniques and mold configurations for fluoroelastomer-metal laminates have theretofore been highly restricted.

BRIEF DESCRIPTION OF THE INVENTION

The present invention provides for the inclusion of a particularly defined amount of calcium oxide in the fluoroelastomer which oxide provides the fluoroelastomers with strong bonding abilities when properly applied to a metal back-up member.

According to the process of this invention, fluoroelastomers are compounded with small amounts of calcium oxide. The compounded CaO-fluoroelastomer is then applied to the metal substrate and simultaneously cured and bonded directly to said substrate without the use of an adhesive bonding agent.

The fluoroelastomers that are particularly benefited by addition of CaO are those commercially available copolymers of hexafluoropropylene and polyvinylidene fluoride, known variously as Viton E60, E60C and LD2873, commercially available from E. I. du Pont de Nemours and Company, Wilmington, Del., and Fluorel 2160, 2170, and FC2170, commercially available from 3M Company, St. Paul, Minn.

Broadly, the invention comprises incorporating an amount of calcium oxide, conveniently in powdered form, uniformly distributed into the uncured fluoroelastomer to achieve an even dispersion of the CaO therein, applying the compounded fluoroelastomer directly to a pretreated metal substrate, and then simultaneously curing the fluoroelastomer and bonding it to the substrate. The laminate obtained thereby is then postcured for a sufficient period of time at elevated temperatures to adjust the bond strength to a desired, generally maximum, value and to oabtain the desired physical properties in the cured fluoroelastomer.

It is essential to pretreat the metal substrate to provide a surface on the substrate receptive to the bond. This can be accomplished, for example, by sandblasting the bonding surface of the substrate, and then oxidizing the sandblasted bonding surface to form an adherent metal oxide thereon. To achieve a satisfactory bond, the oxidized surface of the metal should be substantially free from foreign substances, including oil or grease.

The compounded fluoroelastomer may be applied to the metal substrate by conventional methods to obtain the desired product, for example by injection, compression or transfer molding techniques, depending generally on the intended configuration of the finished laminate. The fluoroelastomer is then simultaneously cured at elevated temperatures while in intimate contact with the metal bonding surface and bonded thereto; adequate pressure is maintained on the elastomer/metal unit during curing to insure a bond at least sufficient to permit demolding of the laminate.

A stronger bond may in some instances be required to permit successful demolding of the laminate from transfer or compression molds or from complex mold configurations. The fluoroelastomer-metal laminate is then postcured at elevated temperatures to increase bond strength to desired levels.

Accordingly, it is an object of this invention to provide a method of simultaneously curing a fluoroelastomer while bonding it directly to a metal backing member without the use of a bonding agent.

It is another object of this invention to provide a method of simultaneously curing a fluoroelastomer and bonding it to a metal member which will produce a fluoroelastomer-metal bond capable of withstanding sustained or heavy loading and/or high ambient temperatures.

It is a further object of this invention to provide a simple method of treating a fluoroelastomer to provide a high strength fluoroelastomer-metal bond when the fluoroelastomer is simultaneously cured and bonded to a metal substrate.

It is an additional object of this invention to provide a simple method of bonding an ultra high temperature thermally stable fluoroelastomer to a metal substrate to achieve a high strength, highly temperature-resistant fluoroelastomer-metal bond to a cured fluoroelastomer.

It is a further object of this invention to expand the molding techniques and mold configurations available for use with fluoroelastomer-metal laminate components.

Additionally, it is another object of this invention to increase the use of fluoroelastomers in applications requiring a strong elastomer-metal bond and high bond strength.

DETAILED DESCRIPTION OF THE INVENTION

For clarity it should be pointed out that two overall reactions occur in the method of the present invention. One of these reactions is curing of the fluoroelastomer and is referred to in following as "curing." The other of these overall reactions is bonding of the fluoroelastomer to a pretreated metal surface and is referred to in following as "bonding." These two reactions must proceed at comparable rates if a useful product is to result. Further, the rates of each of the two reactions must be relatively fast to allow fast production of the product. Surprisingly, it has been found that addition of a carefully controlled amount of CaO in uniform dispersion throughout a fluoroelastomer leads to a proper balancing of the reaction rates and to usefully fast reaction at the same time.

It is preferred that the metal back-up member be treated by grit blasting to produce a medium-rough bonding surface; this may conveniently be accomplished by blasting the metal surface with a suitable abrasive. For example, a steel member may be satisfactorily roughened by blasting the bonding surface with $Al_2O_3$ particles having a grit of about 60 to about 180 to produce a surface roughness of about 50 to about 250 microinches. Other abrasives of larger or smaller grit may be found to be more suitable for use in conjuction with other metals, however, or for use in bonding applications other than those specifically illustrated herein.

The sandblasted metal bonding surface is then treated to oxidize the bonding surface thereof and form an adherent metal oxide thereon. In the case of steel, for example, heating in a forced air oven for from about 1 hour up to about 72 hours at about 600° F produces an adherent surface oxidation layer comprising a ferrous oxide, i.e. FeO and/or $Fe_3O_4$, which is satisfactory for the purposes of this invention. Generally, broad ranges of temperatures, for example from about 300° F to about 1000° F, with the time varying accordingly, are employable to produce adequate suface oxidation of the metal substrate during heating.

Any other conditions that produce a similar surface oxidation of the metal may alternatively be employed, including the use of appropriate chemical reagents to oxidize the bonding surface. Where oxidation is accomplished by heating the metal, the fluoroelastomer may be applied to the bonding surface while the metal is still hot, or after it has cooled.

While not meaning to be bound by theory, it is believed that the bonding of the fluoroelastomer to the metal substrate occurs through formation of direct chemical bonds between one or more valence states of a metal, e.g., ferrous iron as is present in FeO and/or $Fe_3O_4$ which is formed on the metal substrate surface when said metal is iron or iron based, e.g., steel, and is controllably surface oxidized as described above and the fluoroelastomer, probably via an oxygen bridge as by the reaction:

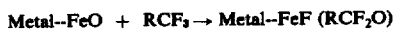
Metal—FeO + RCF$_3$ → Metal—FeF (RCF$_2$O)

Some direct iron-carbon bonding may also or alternately occur as by the reaction:
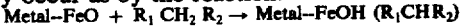
Metal—FeO + R$_1$ CH$_2$ R$_2$ → Metal—FeOH (R$_1$CHR$_2$)

where $R_1$ $R_1$ and $R_2$ represent fluoroelastomer portions and Metal represents the metal substrate bonding surface. Since over oxidation of an iron substrate leads chemically to the foramtion of ferric oxide, $Fe_2O_3$ and practically to an inability to bond the fluoroelastomer to the substrate it follows that ferrous iron oxide is present on the controllably oxidized surface to allow bonding thereto whether or not said bonding is precisely as set out above.

Generally, adequate bonds can be obtained for at least up to about two months after a heat oxidation treatment, provided the bonding surface is kept relatively moisture-free, e.g., under humidity-controlled storage, and oil-free. The latter is of importance, as even excessive handling resulting in fingerprints on the bonding surface may cause increased oxidation and interfere with the bonding mechanism by converting, e.g., FeO and/or $Fe_3O_4$ to $Fe_2O_3$ and its hydrate, $Fe(OH)_3$.

The particular fluoroelastomer selected for bonding will depend primarily on the intended application of the bonded product. In applications where the product must withstand high bulk temperatures, one of the ultra high temperature, thermally stable fluoroelastomers such as Viton E60, Viton E60C, and Viton LD2873, or Fluorel 2160, Fluorel 2170, and Fluorel FC2170 will usually be selected. In some instances it may be advantageous to combine two or more fluoroelastomers, including those of differing thermal stability properties, to obtain desired properties in the finished laminate.

The fluoroelastomer or a combination of fluoroelastomers is compounded with sufficient amounts of calcium oxide to provide a satisfactory bond between the fluoroelastomer and the metal member under conditions of the process of this invention. Typically, from about three to about fifteen parts CaO powder per one hundred parts (php) polymer and preferably about 3 to 7 php thereof will provide a compounded fluoroelastomer formulation which will have satisfactory bonding properties. Preferably, when the ultra high temperature, thermally stable fluoroelastomers such as Viton E60C are to be compounded, a CaO concentration of about 5 php is used.

CaO may of course be incorporated into the elastomer in a form other than powder. A number of dispersions of CaO, both in liquid and paste form are commercially available for incorporation into polymeric materials for conventional use as e.g., desicants, curing agents, and viscosity agents. These forms of CaO may usually be substituted for the CaO powder at an equivalent actual CaO rate, provided other ingredients in these dispersions do not interfere with the bonding mechanisms.

The calcium oxide is incorporated into the fluoroelastomer by conventional mixing procedures, e.g., in a Banbury mixer, to achieve an even dispersion of the CaO throughout the fluoroelastomer. Other desired ingredients may appropriately be incorporated into the fluoroelastomer in this step, for example, curing agents and accelerators, and carbon black will usually be included.

The compounded fluoroelastomer is then applied to the metal bonding surface by appropriate molding techniques, such as transfer, injection or compression molding. By the process of this invention, many molding techniques and part configurations heretofore unavailable with conventional bonding agents may now be employed. Owing to the nature of transfer and injection molding, and the complexity of many proposed mold configurations, conventional bonding agents for fluoroelastomers are subject to scuffing and/or wiping during the molding process, thereby deactivating or destroying the intended bond, and rendering these techniques and configurations useless.

The process of this invention permits the use of these previously unsuitable molding techniques and mold configurations in addition to the conventional molding techniques and mold configurations employable in prior art processes of fluoroelastomer bonding with bonding agents. Since there is no discrete bonding agent employed in the process of the invention, scuffing and wiping problems are eliminated.

In any event, the fluoroelastomer is pressed into intimate contact with the metal member, while curing of the elastomer takes place, thus insuring an adequate bond between the fluoroelastomer and the metal member. Pressures generally from about 250 to about 1500 psi of bonding surface will suffice, and pressures of about 800 to about 1200 psi are generally preferred. Cure times from about 20 minutes at about 325° F to about 30 seconds at about 390° F are generally contemplated; however, the cure time will of course vary according to the ambient temperature, and also individual elastomers and their compounding ingredients may require varying periods of cure time to effect a satisfactory cure. Sufficient curing conditions and adequate pressure to enable the product to be demolded as a unit are at least required. Beyond this, curing conditions may be varied according to the nature of the fluoroelastomer to achieve the desired properties in the cured polymer.

It is hypothesized that the CaO in the fluoroelastomer serves more than one purpose. First, it acts as a dessicant and reacts with water present initially and produced during curing of the fluoroelastomer by the reaction:

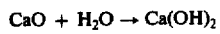

Thus, water is prevented from reacting, under the relatively high temperature and pressure of molding with the controllably oxidized surface to further oxidize said surface and deleteriously affect its ability to bond to the fluoroelastomer. Hence, the example, conversion of FeO to $Fe_2O_3$ is prevented or at least minimized.

Second, the calcium hydroxide formed by reaction of CaO with water reacts with hydrogen fluoride produced during curing and bonding as by the reaction:

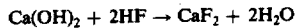

with the water prouced in this reaction being captured through reaction with additional CaO as set out above.

Third, the CaO also serves to reduce the curing rate of the fluoroelastomer by scavenging at least some of the water (which accelerates the cure rate) therefrom. This is important as it causes the curing rate to more closely approach the rate of bonding of the fluoroelastomer to the controllably oxidized surface of the metal substrate. If the concentration of CaO in the fluoroelastomer is too high and hence water content is too low, the curing rate is too slow and hence overly long cure times are required to avoid removal of an only partially cured fluoroelastomer from a mold. Thus, the range of CaO concentrations which are usuable in practising the present invention is generally relatively limited.

Fourth, certain additives to the fluoroelastomer, e.g., glass fiber or the like which can be added thereto to improve frictional and wear characteristics thereof can increase the rate of curing of the fluoroelastomer. Other additives may likewise reduce the rate of curing. In such a situation, the particular amount of CaO used is increased or decreased, as the case may be, to counteract the increased or decreased curing rate by more or less scavenging of water so that the curing rate and the bonding rate are more nearly comparable.

Demolding will usually be facilitated by use of recommended fluorocarbon release agents in the mold. After demolding, the laminate product is postcured for from about 1 to about 20 hours at relatively high tempertures. The preferred temperature range of postcure is from about 400° F to about 500° F, with the time varying accordingly. However, in many instances, depending on the specific fluoroelastomer formulation, including the specific fluoroelastomer employed, temperatures outside this range, for example, above about 350° F will be sufficient to increase bond strength to the desired characteristics, when the postcure time period is accordingly adjusted. Again, within these ranges, postcuring conditions may be varied according to the nature of the fluoroelastomer to achieve the desired properties in the finished polymer. In general, it may be expected that the bond strength will increase during postcure to levels where the bond strength exceeds stock tear strength over a broad temperature range, at least from about 0° F to about 500° F.

Importantly, a satisfactory elastomer to metal bond will be obtained within the broad mold cure and postcure conditions disclosed herein. Thus, specific conditions within these ranges under which these cures are accomplished, are selected according to the final physical properties desired, and the particular demands of the specific fluoroelastomer.

The following chart contains examples of specific fluoroelastomer formulations which were bonded to a steel member according to the process of this invention:

| Elastomer | PHP | PHP | PHP | PHP | PHP |
|---|---|---|---|---|---|
| Viton | | | | | |
| B | 100 | | | | |
| B 50 | | 100 | | | |
| E60C | | | 80 | | 100 |
| A-HV | | | 20 | | |
| LD 2873 | | | | 100 | |
| MT (carbon) Black | 60 | 30–60 | 30–100 | 60 | 30–65 |
| CaO | 15 | 15 | 5–10 | 5 | 5 |
| Accelerators | ← | | As required | | → |
| Curatives | ← | | As required | | → |

The following charts tabulate the effect of calcium oxide addition on the black-loaded fluoroelastomer formulations based on Viton E60C:

| Composition | Parts/100 parts polymer | | | | |
|---|---|---|---|---|---|
| Compound | A | B | C | D | E |
| Viton E60C | 80 | 80 | 100 | 100 | 100 |
| Viton A | 20 | 20 | | | |
| MT (carbon) Black (N990) | 60 | 60 | 60 | 60 | 60 |
| Ca(OH)2 | 6 | 6 | 6 | 6 | 6 |
| MgO (Maglite D) | 3 | 3 | 3 | 3 | 3 |
| CaO | — | 5 | — | 5 | 10 |

Mix technique: Preblend all powder ingredients, Banbury Mixed

Mix
 0 minutes — add polymer
 30 minutes — add ½ preblend
 60 minutes — add ½ preblend
 150 minutes — bump and brush down
 240 – 300 minutes — dump at 250° F discharge temperature

| | A | B | C | D | E |
|---|---|---|---|---|---|
| Cure Times: min./° F | 3/370 | 3/370 | ½/390 | ½/390 | ½/390 |
| Note: Parts compression molded at 1500 | | | 1½/390 | 1½/390 | 1½/390 |
| to 600 psi (2500 psi molding pressure is normal) | | | 1½/370 | 1½/370 | 1½/370 |

Postcures: Hrs./° F

24/450  24/450  [ 2/500   4/500   6/500 ]*
                 4/475   8/475  12/475
                        16/475  24/450

Steel Preparation:
 Grit blasted at 40–70 psi with 60 to 100 grit

*continued*

$Al_2O_3$ depending on grade and heat treatment of steel.
 100 grit $Al_2O_3$ at 40 psi is satisfactory for SAE 1040–1080 $R_B85$ steel, and SAE 4140 $R_C30$ steel.
 60 grit at 40 psi or 100 grit at 70 psi is satisfactory for nitrided steels.
 Treatment in air at 500 – 750° F
 e.g. 6 hrs./500° F; 2–3 hrs./600° F; 1–2 hours/750° F.
 Mold part with steel temperature ≈ same as that of mold, ± 20° F.

*Each postcure used with each of C, D and E

Bond Test Results:1

| | | Bond Condition | | | |
|---|---|---|---|---|---|
| Postcure | Test Temp. | A | B | C | D |
| As molded | Demold | Falls off | OK-Peels | Won't | OK-Peels OK |
| 2/500(hrs/° F) | 500 | | | Falls off | Good Exc. |
| 4/500(hrs/° F) | 500 | | | Falls off | VG-Exc. Good |
| 6/500(hrs/° F) | 500 | | | Falls off | Exc. Peels |
| +24/520(hrs/° F) | 520 | | | — | Peels Falls off |
| +6/600(hrs/° F) | 600 | | | — | Falls off Falls off |
| 4/475(hrs/° F) | 475 | | | Falls off | VG-Exc. Exc. |
| 8/475(hrs/° F) | 475 | | | Falls off | Exc. Good |
| 12/475(hrs/° F) | 475 | | | Falls off | Exc. Peels |
| 16/450(hrs/° F) | 450 | Falls off | Exc. | Falls off | Exc. — |
| 24/450(hrs/° F) | 450 | Falls off | Exc. | Falls off | Exc. — |
| +6/500(hrs/° F) | 500 | Falls off | Exc. | Falls off | Good — |
| 16/450+1000 hours in oil at 350° F | 450 | | Exc. | | Exc. |
| 2/520(hrs/° F) | 520 | | | | VG |
| 4/520(hrs/° F) | 520 | | | | Good |
| 6/520(hrs/° F) | 520 | | | | Poor-Fair |

1Each row represents results of 3 to 6 samples.
* With addition of approximately .3% $H_2O$ to base mix (simulated high humidity) Compound E will give results comparable to those shown for Compound D. (Through reduction of effective CaO content by reaction thereof to form $Ca(OH)_2$.) All test data taken for materials mixed and molded under conditions of controlled humidity 55% R.H. at 75° F.

From the above formulations and test results it will be apparent that the addition of CaO to the fluoroelastomer formulations advantageously affects the bonding to metal backings.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A method of bonding fluoroelastomers directly to metal without the use of a bonding agent between the fluoroelastomers and the metal while simultaneously curing the fluoroelastomers comprising pretreating a metal member by roughening a bonding surface thereof and then oxidizing the roughened bonding surface under oxidation conditions so controlled as to form an adherent oxide thereon; pressing a fluoroelastomer compounded with a minor amount of CaO evenly dispersed therethroughout directly to the adhered oxide covered bonding surface of the pretreated metal member without the use of a bonding agent other than said adherent oxide between said fluoroelastomer and said bonding surface; curing the fluoroelastomer-CaO dispersion at an elevated temperature in direct pressed contact with the adherent oxide covered bonding surface of the metal member and simultaneously forming a bond with said adhered oxide covered surface; and postcuring the resultant product to strengthen the bond.

2. A method as in claim 1, wherein the fluoroelastomer is compounded with from about 3 to about 15 parts CaO per 100 parts fluoroelastomer; the fluoroelastomer is in pressed contact with the metal bonding surface under pressures from about 250 to about 1500 psi of bonding surface; and the cured product is postcured for a time which falls within the range from about 1 to about 20 hours at a temperature which falls within the range from about 350° F to about 500° F.

3. A method as in claim 2, wherein the metal member is steel the oxide comprises a ferrous oxide and the fluoroelastomer is a copolymer of hexafluoropropylene and polyvinylidene fluoride.

4. A method as in claim 2, wherein the cured product is postcured at a temperature which falls within the range from about 400° F to about 500° F.

5. A method as in claim 1, wherein the fluoroelastomer is an ultra high temperature, thermally stable fluoroelastomer; the fluoroelastomer is compounded with from about 3 to about 15 parts of CaO per 100 parts fluoroelastomer; the fluoroelastomer is in pressed contact with the bonding surface under pressures from about 250 to about 1500 psi of bonding surface; the fluoroelastomer is cured and bonded to said bonding surface at a temperature which falls within the range from about 325° to about 390° F for a period of time which falls within the range from about 20 minutes to about 30 seconds; and the resultant product is postcured at a temperature which falls within the range from about 350° to about 500° F for a time which falls within the range from about 1 to about 20 hours.

6. A method as in claim 5, wherein the metal member is steel, the oxide comprises a ferrous oxide and the fluoroelastomer is a copolymer of hexafluoropropylene and polyvinylidene fluoride.

7. A method as in claim 6, wherein the product is postcured at a temperature which falls within the range from about 400° to about 500° F.

8. A method as in claim 7, wherein the fluoroelastomer is compounded with from about 3 parts to about 7 parts of CaO per 100 parts fluoroelastomer.

* * * * *